(12) United States Patent
Arai

(10) Patent No.: US 6,317,405 B1
(45) Date of Patent: Nov. 13, 2001

(54) METHOD OF AND DEVICE FOR CONTROLLING LIGHT POWER TO BE USED FOR RECORDING ON OPTICAL DISK

(75) Inventor: Akira Arai, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/350,749

(22) Filed: Jul. 9, 1999

(30) Foreign Application Priority Data

Jul. 13, 1998 (JP) .................................................. 10-197114

(51) Int. Cl.[7] ........................................................ G11B 7/00
(52) U.S. Cl. ...................... 369/116; 369/53.37; 369/53.27
(58) Field of Search .................................. 369/116, 121, 369/47.5, 53.26, 53.27, 53.37, 53.45, 53.11, 59.11, 59.21

(56) References Cited

U.S. PATENT DOCUMENTS

| 4,685,097 | 8/1987 | van der Put . | |
|---|---|---|---|
| 4,894,525 | * 1/1990 | Kakuta ................................. | 250/205 |
| 4,937,809 | * 6/1990 | Miyadera et al. ..................... | 369/116 |
| 5,184,343 | * 2/1993 | Johann et al. ........................ | 369/116 |
| 5,274,622 | 12/1993 | Kono . | |
| 5,355,360 | * 10/1994 | Kawashima ........................... | 369/116 |

* cited by examiner

*Primary Examiner*—Thang V. Tran
(74) *Attorney, Agent, or Firm*—Pillsbury Winthrop LLP

(57) ABSTRACT

A read control system and a write control system are controlled separately in such a manner that a level of read power to be used for reading out information from an optical disk and a level of write power to be used for writing information onto the optical disk approach their respective target values. Automatic pre-calibration process is performed on a relationship between a control input to and a control output from the write control system, in order to provide an optimum write power level from the very beginning of recording. The above-mentioned automatic pre-calibration process includes comparing a current control input to the read control system with a control input to the read control system in the last calibration prior to initiation of recording operations and causing the write control system to execute the automatic calibration of the relationship only when a difference between the compared control inputs is greater than a predetermined reference value.

2 Claims, 3 Drawing Sheets

METHOD OF AND DEVICE FOR CONTROLLING LIGHT POWER TO BE USED FOR RECORDING ON OPTICAL DISK

BACKGROUND OF THE INVENTION

The present invention relates generally to optical disk recording methods and apparatus for recording desired information on an optical disk, such as a CD-R, CD-RW, CD-WO, MD or DVD, by light power, and more particularly to a method of and device for controlling the light power to be used for recording on the optical disk.

In the conventionally known write-once and rewritable optical disks (CD-Rs and CD-RWs), data-carrying pits are formed by laser light, having controlled power levels as shown in FIG. 3, onto a disk surface coated with a dye-based recording material. In order to form such pits in the optical disks stably in constant conditions, it is necessary to control a laser-diode driving current in such a way that constant read and write laser power levels Pr and Pw are achieved at any time. Specifically, to this end, part of the laser light emitted from the laser diode is detected as an electric current by a monitor photo detector and the thus-detected current value is compared to a predetermined target value. ALPC (Automatic Laser Power Control) servo circuit is normally provided to control the laser diode output to always follow the target value. The ALPC servo circuit is generally composed of a detection-related component group including the above-mentioned monitor photo detector and a drive-related component group for driving the photo detector. The detection-related component group has inherent error factors such as a dark current in the photo detector and offsets in a current-to-voltage (I/V) converter amplifier and in sample and hole circuits, and the drive-related component group also has inherent error factors such as offsets in buffer amplifiers and in current amplifiers. Thus, it has been a common practice to compensate for sensitivity differentials in the detection-related component group and automatically calibrate the sensitivities and offsets of the drive-related component group, by measuring such electrical offsets, canceling offsets in input signals to A/D converters and also performing test laser light emission.

A series of these automatic calibration operations for the ALPC servo system is generally performed prior to a trial write procedure, commonly called "OPC" (Optimum Power Calibration), that is intended to determine an optimum recording power for each disk; specifically, it has been conventional to carry out such automatic calibration operations upon power-up or at one other time, for each linear recording speed, in combination with the OPC procedure.

Then, actual recording on the optical disk is performed using the optimum recording power determined through the OPC procedure; however, if the laser light power at the beginning of the recording is increased gradually from the zero level with the servo control activated, part of pit-forming regions would be undesirably left unrecorded. To avoid this inconvenience, there has been employed a scheme, in accordance with which the laser light is raised instantaneously up to the optimum recording power level with the servo loop opened and then the servo loop is closed once the optimum recording power level is reached.

FIG. 4 shows a typical example of relationship between a laser-diode driving current and a resultant light output from the laser diode. As shown, a variation occurs in this relationship as the temperature changes from a value T to another value T'. Assuming that the electric current levels to provide a read power level Pr and write power level Pw at the temperature T are Ir and Iw, these current levels have to be changed to Ir' and Iw', respectively, at the other temperature T', in order to keep the laser light output constant. Particularly, with the recent high-power lasers, the driving current has to be considerably varied to provide constant read and write power levels, because characteristics of these high-power lasers tend to be greatly varied due to temperature changes.

When the temperature changes during the write operations with the servo control active, substantially no problem is encountered because the servo control allows the driving current to automatically follow the light output so that the resultant light output remains constant in level. However, in case the temperature changes, for example, from T to T' during a recording standby state, the write power would amount only to a level Pw' even though the writing current level Iw, which was optimum at the last automatic calibration, is applied to the recording at the T' temperature. Writing current level Iw' must be applied, to obtain the target write power level Pw. Because an output value from a digital-to-analog converter (hereinafter also called a DAC value) for initiating the laser light emission, obtained through the last automatic calibration, would thus invite in an unwanted deviation in the laser power when a temperature change occurs during the recording-standby state, further automatic calibration operations are necessary to again determine an appropriate DAC value for initiating the laser light emission.

Such automatic calibration operations may be carried out upon lapse of every predetermined time, at predetermined time intervals, or in response to each temperature change detected within the device in question. But, these automatic calibration operations are initiated irrespective of a user's intention in any case, so that if reproduction of the recorded data is requested in the course of the calibration, the reproduction performance would be unavoidably degraded even though some preventive measure, such as temporary suspension of the calibration,. is taken. Such degradation of the reproduction performance would lead to a significant problem in reproducing CD-ROMs of video games and the like of which relatively quick responsiveness is required.

Further, detecting temperature changes within the device requires a separate temperature sensor, which would add to the costs and also cause detection errors unless it is located close to the laser diode. If such a temperature sensor is provided above the write head, the number of signal lines on the flexible circuit board has to be increased, which would further add to the costs and become a major cause of degradation in access performance.

SUMMARY OF THE INVENTION

It is therefore an object of the present invention to provide a method and device for controlling light power to be used for recording on an optical which achieve quick responsiveness, reduced costs and enhanced access performance.

The present invention provides a method of controlling light power to be used for recording on an optical disk, which comprises the steps of: controlling a read control system and a write control system separately in such a manner that a level of read power to be used for reading out information from an optical disk and a level of write power to be used for writing information onto the optical disk approach their respective target values; and automatically pre-calibrating a relationship between a control input to and a control output from the write control system, in order to provide an optimum write power level from the very beginning of recording operations. In the present invention, the above-mentioned step of automatically pre-calibrating includes a step of, prior to initiation of the recording operations, comparing a current control input to the read control system with a control input to the read control system in the last calibration and a step of causing the write control system to execute the automatic calibration of the relationship only when a difference between the current and last control inputs is greater than a predetermined reference value.

The present invention also provides a device for controlling light power to be used for recording on an optical disk, which comprises: a read power control system that controls a level of read power to be used for reading out information from an optical disk; a write power control system that controls a level of write power to be used for writing information onto the optical disk; a drive section that adds together outputs from the read power control system and the write power control system and drives an light emitting element in accordance with a sum of the outputs; and a control unit that performs an automatic calibration process for calibrating a relationship between a control input to and a control output from the write control system. Specifically, the control unit, prior to initiation of recording operations, compares a control input to the read control system with a control input to the read control system in the last calibration and executing the automatic calibration process only when a difference between the current and last control inputs is greater than a predetermined reference value.

Because a temperature change is detected on the basis of a change in the control inputs to the read control system, the present invention can eliminate a need for a separate temperature sensor. Thus, the present invention can significantly reduce the necessary costs and also can directly detect every temperature change in the light emitting element such as a laser diode. In addition, with the arrangement that the calibration by an ALPC servo system is performed only when a user actually intends to effect writing on the optical disk and when a variation in data write characteristics due to a temperature change is anticipated, the present invention can advantageously minimize the degradation in the reproducing/recording performance.

DETAILED DESCRIPTION OF THE PREFERRED EMBODIMENTS

Figure 1:
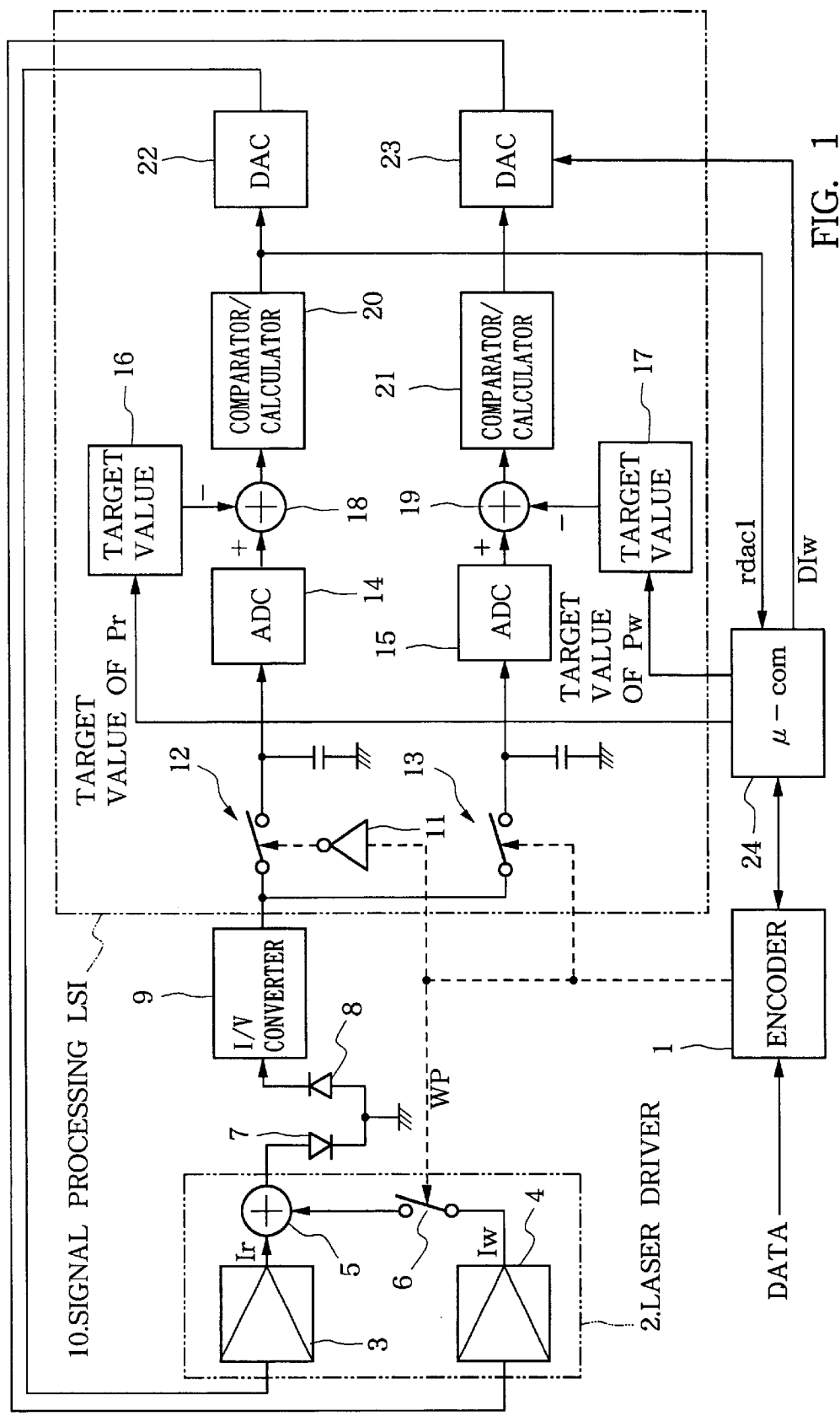
FIG. 1 is a block diagram showing principal components of a recording power control device for use with an optical disk recording apparatus in accordance with an embodiment of the present invention.

FIG. 1 is a block diagram showing principal components of a recording power control device in an optical disk recording apparatus in accordance with an embodiment of the present invention.

Recording data is input to an encoder 1, which, in turn, outputs a write pulse signal WP. Laser driver 2 is composed of a current amplifier 3 for continuously outputting a read current Ir, another current amplifier 4 for outputting a write current Iw to be added to the read current Ir from the current amplifier 3, and an adder 5 and a switch 6 for adding together these output currents from the amplifiers 4 and 5 in response to the write pulse WP given from the encoder 1. Note that whereas the illustrated example includes only one current amplifier for outputting the write current Iw to be added to the read current Ir, a plurality of such current amplifiers may be provided so as to add their respective outputs to the read current in a situation where the write pulse signal is to be varied into a more complicated shape, e. g., where the electric current level at the rising edge of the write pulse is to be raised instantaneously. Output from the laser driver 2 is fed to a laser diode 7 so that the laser diode 7 emits laser light for recording on a writable or rewritable optical disk. At that time, part of the laser light emitted from the laser diode 7 is detected or monitored as an electric current value by a photo diode 8, and the detected current value is converted into a voltage via a current-to-voltage (I/V) converter 9 and then given to a signal processing LSI 10 for the purposed to be described below.

In accordance with the write pulse WP, the signal processing LSI 10 separates the given voltage into two voltage components, i.e., a read voltage component and a write voltage component, and then samples and holds these two voltage components. More specifically, the signal processing LSI 10 includes a first sampling circuit 12 for holding the read voltage component in response to a non-write pulse obtained by inverting the write pulse WP via an inverter 11, and a second sampling circuit 13 for holding the write voltage component in response to the write pulse WP. The read voltage component is then passed to a first A/D converter (ADC) 14 that converts the voltage component into a digital monitored-read-voltage value, while the write voltage component is passed to a second A/D converter (ADC) 15 that converts the voltage component into a digital monitored-write-voltage value. These monitored voltage values from the ADCs 14 and 15 are compared to respective predetermined target values 16 and 17 given by a microcomputer 24, and differences between the monitored voltage values and the target values are calculated by means of subtracters 18 and 19 and fed to comparator/calculator sections 20 and 21, respectively. Each of the comparator/calculator sections 20 and 21 calculates a correction value to compensate for the difference given from the corresponding subtracter 18 or 19. The correction values output from the comparator/calculator sections 20 and 21 are then delivered to first and second D/A converters (DACs) 22 and 23, respectively. Because respective output values Ir and Iw from the first and second D/A converters (DACs) 22 and 23 are directly proportional to each other, an ALPC (Automatic Laser Power Control) servo circuit, functioning, to keep the read power Pr and write power Pw at the respective target power values, can be formed by applying the D/A-converted voltages or currents to the current amplifiers 3 and 4 of the laser driver 2 as control voltages or currents. In the illustrated example of FIG. 1, the sample and hold circuit 12, ADC 14, target value register 16, subtracter 18, comparator/calculator section 20, DAC 22 and current amplifier 3 together constitute a read control system, while the sample and hold circuit 13, ADC 15, target value register 17, subtracter 19, comparator/calculator section 21, DAC 23 and current amplifier 4 together constitute a write control system.

The ALPC servo circuit is generally composed of a detection-related component group from the photo detector 8 to the A/D converters 14 and 15, and a drive-related component group from the D/A converters 22 and 23 to the laser diode 7. The detection-related component group has inherent error factors such as a dark current in the photo detector 8 and offsets in the I/V converter amplifier 9 and in the sample and hole circuits, and the drive-related component group also has inherent error factors such as offsets in buffer amplifiers and in the current amplifiers. Thus, the illustrated example is arranged to compensate for sensitivity differences in the detection-related component group and automatically calibrate the sensitivities and offsets of the drive-related component group, by measuring such electrical offsets, cancelling offsets in the input signals to the A/D converters and also effecting test laser light emission.

Because the laser diode keeps emitting the laser light at the read power level during the recording-standby period, the instant embodiment can identify every temperature change, on the basis of a change in the laser-diode controlling voltage or current for generating the read power. For this purpose, the output value from current amplifier 3 the DAC 22 for generating the read power is constantly monitored, so that only when it is determined, from a variation in the output value from the reading DAC 22, that there has occurred a substantial temperature change that may interfere with the laser light emission at the write power level, the output value from the writing DAC 23 is remeasured in response to issuance of a write instruction.

Figure 2:
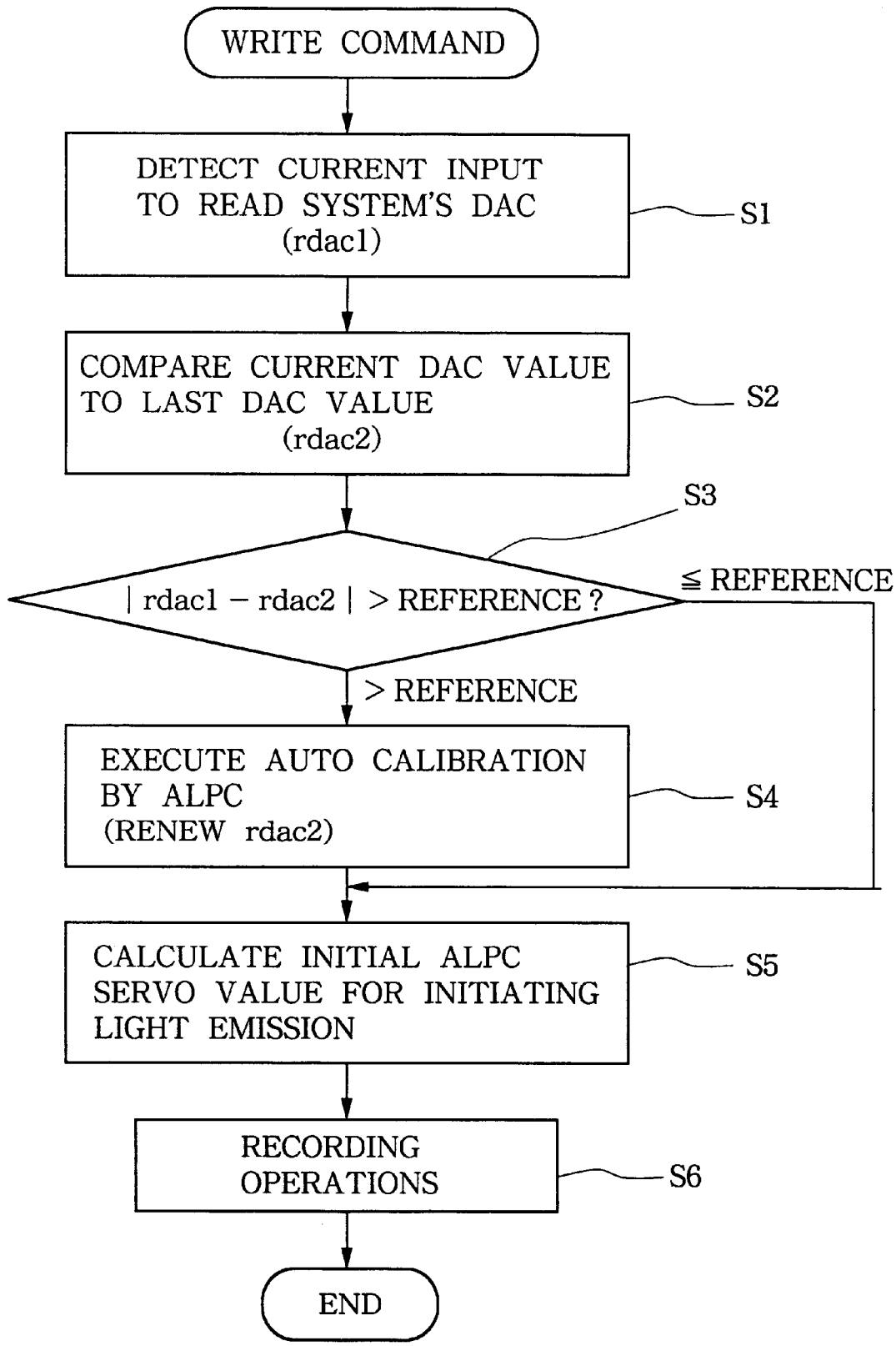
FIG. 2 is a flow chart of operations that are carried out, during recording, by a microcomputer in the recording power control device of FIG. 1.
Figure 3:
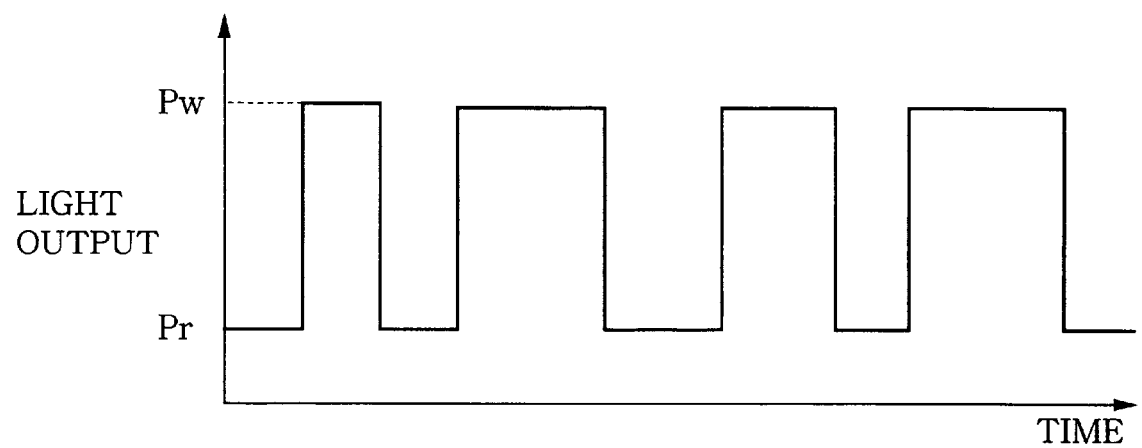
FIG. 3 is a waveform diagram of a write pulse signal.
Figure 4:
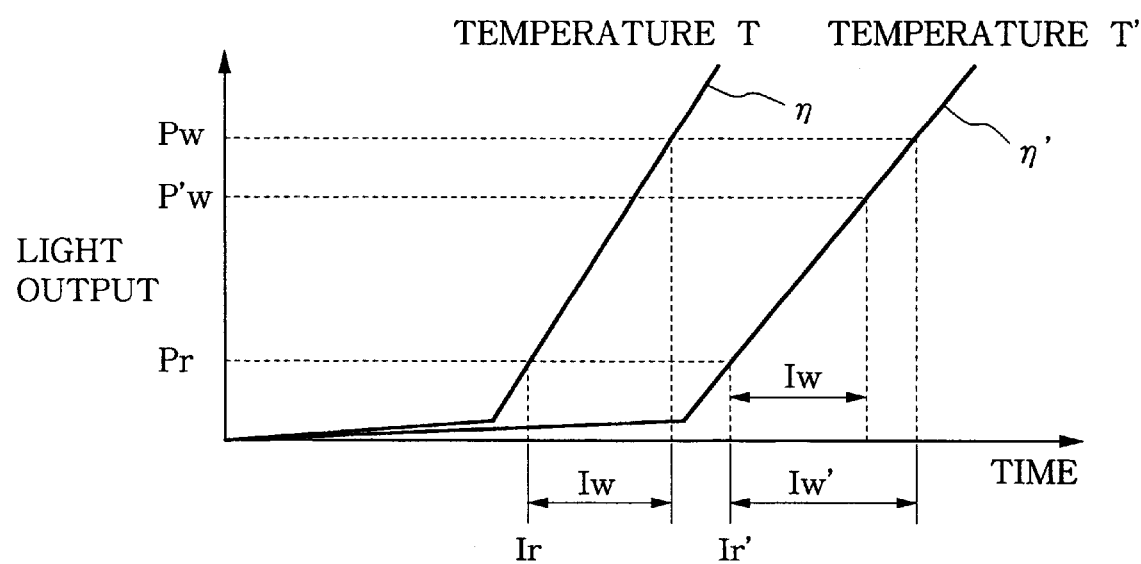
FIG. 4 shows a typical example of relationship between a laser-diode driving current and a resultant light output from the laser diode.

FIG. 2 is a flow chart of the operations carried out by the microcomputer 24 during recording.

Once a write command is issued, the microcomputer 24 detects a value currently input to the DAC 22 (current DAC value rdac1) of the read control system at step SI and then, at step S2, compares the current DAC value (rdac1) to a value input to the DAC 22 in the last ALPC's automatic calibration (last DAC value rdac2). If an absolute value of the difference between the current DAC value and the last DAC value (|rdac1−rdac2|) is greater than a predetermined reference value as determined at step S3, then the microcomputer 24 judges that there has occurred a change in environmental conditions such as temperature, and thus executes the automatic calibration by means of the ALPC servo circuit to thereby renew the DAC value rdac2 at step S4. If, on the other hand, the difference (|rdac1−rdac2|) is not greater than the predetermined reference value as determined at step S3, then the microcomputer 24 judges that there has occurred no temperature change and thus does not execute the automatic calibration. After that, the microcomputer 24 calculates an initial ALPC servo value DIw for initiating the laser light emission at step S5, sets the thus-calculated ALPC servo value DIw in the DAC 23, and then carries out the recording operations at step S6.

In summary, the present invention is characterized by detecting a temperature change on the basis of a change in control inputs to the read control system, eliminating a need for a temperature sensor. With this simplified arrangement, the present invention can significantly reduce the necessary costs and also can directly detect every temperature change of the light emitting element such as the laser diode. In addition, with the arrangement that the calibration by the ALPC servo system is performed only when the user actually intends to effect writing on the optical disk and when a variation in data write characteristics due to a temperature change is anticipated, the present invention can advantageously minimize the degradation in the reproducing/recording performance.

What is claimed is:

1. A method of controlling light power to be used for recording on an optical disk, said method comprising the steps of:

controlling a read control system and a write control system separately in such a manner that a level of read power to be used for reading out information from an optical disk and a level of write power to be used for writing information onto the optical disk approach their respective target values; and automatically pre-calibrating a relationship between a control input to and a control output from said write control system, in order to provide an optimum write power level from the very beginning of recording, wherein said step of automatically pre-calibrating includes a step of, prior to initiation of recording operations, comparing a current control input to said read control system with a control input to said read control system in last calibration and a step of causing said write control system to execute automatic calibration of the relationship only when a difference between the control inputs is greater than a predetermined reference value.

2. A device for controlling light power to be used for recording on an optical disk, said device comprising:

a read power control system that controls read power to be used for reading out information from an optical disk;

a write power control system that controls write power to be used for writing information onto the optical disk;

a drive section that adds together outputs from said read power control system and said write power control system and drives an light emitting element in accordance with a sum of the outputs; and a control unit that performs an automatic calibration process for calibrating a relationship between a control input to and a control output from said write control system, said control unit, prior to initiation of recording operations, comparing a current control input to said read control system with a control input to said read control system in last calibration and executing the automatic calibration process only when a difference between the control inputs is greater than a predetermined reference value.

* * * * *